United States Patent [19]
Pollak

[11] Patent Number: 5,790,226
[45] Date of Patent: Aug. 4, 1998

[54] GOLF BIFOCALS

[76] Inventor: David A. Pollak, 11 Yeatman Ct., Silver Spring, Md. 20902

[21] Appl. No.: 749,559

[22] Filed: Nov. 15, 1996

[51] Int. Cl.⁶ .................................................. G02C 7/06
[52] U.S. Cl. .................................................. 351/54; 351/41
[58] Field of Search ............................... 351/54, 55, 41

[56] References Cited

U.S. PATENT DOCUMENTS

| | | |
|---|---|---|
| 772,196 | 10/1904 | Ward ........................................... 351/54 |
| 1,085,522 | 1/1914 | Baker .......................................... 351/54 |
| 1,637,406 | 8/1927 | Brumder . |
| 2,045,399 | 6/1936 | McMurdo . |
| 4,022,475 | 5/1977 | Todd . |
| 4,690,524 | 9/1987 | Daniels et al. . |
| 4,846,913 | 7/1989 | Frieder et al. . |
| 4,869,588 | 9/1989 | Frieder et al. . |
| 4,957,295 | 9/1990 | McConkey . |
| 5,414,476 | 5/1995 | Pavelle et al. . |
| 5,444,501 | 8/1995 | Aloi et al. . |

*Primary Examiner*—Hung X. Dang
*Attorney, Agent, or Firm*—Greenblum & Bernstein P.L.C.

[57] ABSTRACT

The present invention includes a pair of glasses to be worn by a golfer where only one of the lenses contains a reconfigured bifocal lens, i.e. bifocal element. The placement of the bifocal element may be determined by the writing hand of the wearer or may be determined by whether the wearer has a right-handed golf swing or a left-handed golf swing, depending upon the preference of the wearer. In an alternative embodiment, the bifocal element may be placed in both lenses provided that the near vision segment is positioned in the upper outermost temporal portion of the lenses.

34 Claims, 2 Drawing Sheets

GOLF BIFOCALS

BACKGROUND OF THE INVENTION

1. Field of the Invention

The present invention is directed to an ophthalmic apparatus and in particular to a vision correcting device used while playing sports such as golf and other activities where distance viewing is required for most of the viewing and near viewing is required for a only small percentage of the time. The invention seeks to alleviate the existing difficulties experienced by wearers of bifocals or reading glasses while playing sports such as golf, bowling, billiards, etc.

2. Background and Material Information

It has been found that the wearer of bifocals, trifocals or progressive lenses experiences discomfort when playing various sporting activities, especially golf. Conventionally, the bifocal segment is located at the nasal or lower portion of the lenses. As such, the bifocal is placed in a position that interferes with a golfer's line of vision during body and head positioning prior to commencing a stroke to contact the ball. Progressive lenses, a multi focal lens with no discernable line of demarcation, also create the same discomfort for the golfer. Additionally, golfers who require glasses only for reading must continually apply and remove their reading glasses, for instance, during the playing and scoring phases of their game. The present invention seeks to alleviate these problems experienced by golfers.

Specialized vocational bifocals and trifocals are known in the prior art. For instance, trifocals are employed in the meat cutting industry. In practice, the lenses are divided into upper, middle, and lower focal points, the upper focal segment being used for intermediate distance viewing, the middle segment being used for distance viewing, and the lower segment being used for near viewing. Similarly, upper bifocals are known for pilots, where the upper segment is for near viewing and the lower segment is for distance viewing. However, none of the prior art suggests a specialized bifocal that alleviates the problems facing golfers wearing bifocals or reading glasses.

SUMMARY OF THE INVENTION

The present invention preferably includes a pair of glasses to be worn by a golfer where only one of the lenses contains a reconfigured bifocal lens, i.e. bifocal element. Alternatively, both of the lenses may contain the reconfigured bifocal lens. The placement of the bifocal element may be determined by the writing hand of the wearer or may be determined by whether the wearer has a right-handed golf swing or a left-handed golf swing, depending upon the preference of the wearer. In the former case, preferably, but not absolutely necessarily, the bifocal element is placed in the frame opposite the hand that the golfer uses to write. This positioning is utilized so that the hand of the writer does not interfere with near viewing as accomplished through the bifocal segment. For instance, for wearers who write with their left hand, the bifocal element is most preferably placed in the right side of the frame. Conversely, for wearers who write with their right hand, the bifocal element is placed in the left side of the frame. Besides those who normally wear bifocals, this invention may also be used for golfers who require only reading glasses.

As indicated previously, the placement of the bifocal element may be determined by whether the golfer employs a right-handed or left-handed golf swing. In this case, preferably, but not absolutely necessarily, the bifocal element is placed in the right side of the frame if the wearer has a right-handed golf swing. Conversely, the bifocal element is placed in the left side of the frame if the wearer has a left-handed golf swing. For example, during the backswing of a right-handed golf swing, golfers usually transfer their vision to the left eye. By placing the bifocal segment in the right side of the frame, the golfer would be able to utilize the entire left lens on the ball, i.e. distance viewing. As a result, the golfer suffers no bifocal distortion or interference. Conversely, for golfers with a left-handed swing, the bifocal element is placed in the left side of the frame.

According to a first aspect of the invention, an ophthalmic apparatus comprises a frame having first and second lens supporting structures. The first lens is supported by the first lens supporting structure of the frame and comprises a lens for distance viewing. The second lens is supported by the second lens supporting structure of the frame and comprises a lens segment for distance viewing and a lens segment having a corrective power for near viewing. The near viewing lens segment is provided in only one of said first and second lenses. Preferably, the near viewing segment is provided in an upper outermost temporal portion of the second lens. Further, the near viewing segment is no less than 9 mm in diameter with a maximum of 22 mm in diameter, and is substantially semi-circular in shape. Further, the near viewing segment is provided at a position 5 mm above an optical center of the second lens. The second lens may be mounted in a dexter side of the frame for wearers who write with their left hand. The second lens may be mounted in a sinister side of the frame for wearers who write with their right hand. In the alternative, and depending upon the preference of the wearer, the second lens may be placed in the dexter side of the frame for golfers with a right-handed swing, or in the sinister side of the frame for golfers with a left-handed swing.

According to another aspect of the invention, an ophthalmic apparatus comprises a frame having first and second lens supporting structures, wherein a first lens is supported by the first lens supporting structure of the frame and comprises a lens segment for distance viewing. A second lens is supported by the second lens supporting structure of the frame and comprises a lens segment for distance viewing.

At least one of the first and second lenses comprise a lens segment for near viewing, which is provided in an upper outermost temporal portion of the lens or lenses. Preferably the near viewing segments of the lens or lenses is not less than 9 mm in diameter with a maximum of 22 mm in diameter. Further preferably, the near viewing segments of the lens or lenses is substantially semi-circular in shape and is provided at a position 5 mm above an optical center of the lens or lenses.

More broadly, the invention is directed to a method of assembling an ophthalmic apparatus comprising the steps of fixedly mounting first and second lenses in a frame having first and second lens supporting structures. The first lens is supported by the first lens supporting structure and comprises a lens for distance viewing. The second lens is supported by the second lens supporting structure and comprises a lens segment for distance viewing and a lens segment having a corrective power for near viewing. The near viewing lens segment is provided in only one of said first and second lenses. Preferably, the near viewing segment is provided in an upper outermost temporal portion of the second lens. Further, the near viewing segment is no less than 9 mm in diameter with a maximum of 22 mm in diameter, and is substantially semi-circular in shape. Further, the near viewing segment is provided at a position 5 mm above an optical center of the second lens. The second lens is preferably mounted in a dexter side of the frame for wearers who write with their left hand. The second lens is preferably mounted in a sinister side of the frame for wearers who write with their right hand. In the alternative, and depending upon the preference of the wearer, the second lens may be placed in the dexter side of the frame for golfers with a right-handed swing, or in the sinister side of the frame for golfers with a left-handed swing.

More broadly, the invention is directed to a method of assembling an ophthalmic apparatus comprising the steps of fixedly mounting first and second lenses in a frame having first and second lens supporting structures. At least one of the first and second lenses comprises a lens segment for distance viewing and a lens segment having a corrective power for near viewing. The near viewing segment is provided in an uppermost temporal portion of said at least one of said first and second lenses. Preferably the near viewing segments of the lens or lenses is not less than 9 mm with a maximum of 22 mm in diameter. Further preferably, the near viewing segments of the lens or lenses is substantially semi-circular in shape and is provided at a position 5 mm above an optical center of the lens or lenses.

BRIEF DESCRIPTION OF THE DRAWINGS

The invention will now be described in more detail with reference to the attached drawings.

DETAILED DESCRIPTION OF THE INVENTION

The lens frames for the present invention may be of the conventional type already in existence, or any other possible variation. The frame may be constructed of any conventional materials including but not limited to plastics, metals or any other materials out of which such frames are made. Likewise, the lenses may be made of any conventional materials, preferably CR-39 or polycarbonate; although, a high index material may be used. Depending upon the preference of the wearer, the lenses can be clear, tinted or anti-reflective. Furthermore, the lenses may be scratch protected by any of the means conventionally available.

As previously discussed, the present invention attempts to alleviate the discomfort experienced by wearers of bifocals or reading glasses when undertaking sporting activities such as golf, bowling, billiards, etc. The present invention is not strictly limited to sporting activities and may be employed during any undertaking. Conventionally, a bifocal segment is placed in a position that interferes with the golfer's vision as he attempts to line up his body and head prior to contacting the ball. By modifying the position of the bifocal, a golfer may utilize approximately 90% of his lenses for distance vision (DV) and the remaining portion of his lenses for near vision (NV), DV being the vision employed in any other instance than when NV is employed. The near vision segment may be used during scoring, reading the rule book, examining the time or whenever near vision viewing is required. According to the present invention, any corrective power may be employed in the DV or NV segments. It should be noted that the DV segment does not necessarily have to be corrective in nature, as will be discussed later. Preferably, the corrective power of the NV segment includes about +1.00 to +4.00, increasing in 0.25 increments. Also preferably, the corrective power of the DV segment includes about −20.00 to +11.00, also increasing in 0.25 increments.

Figure 1:
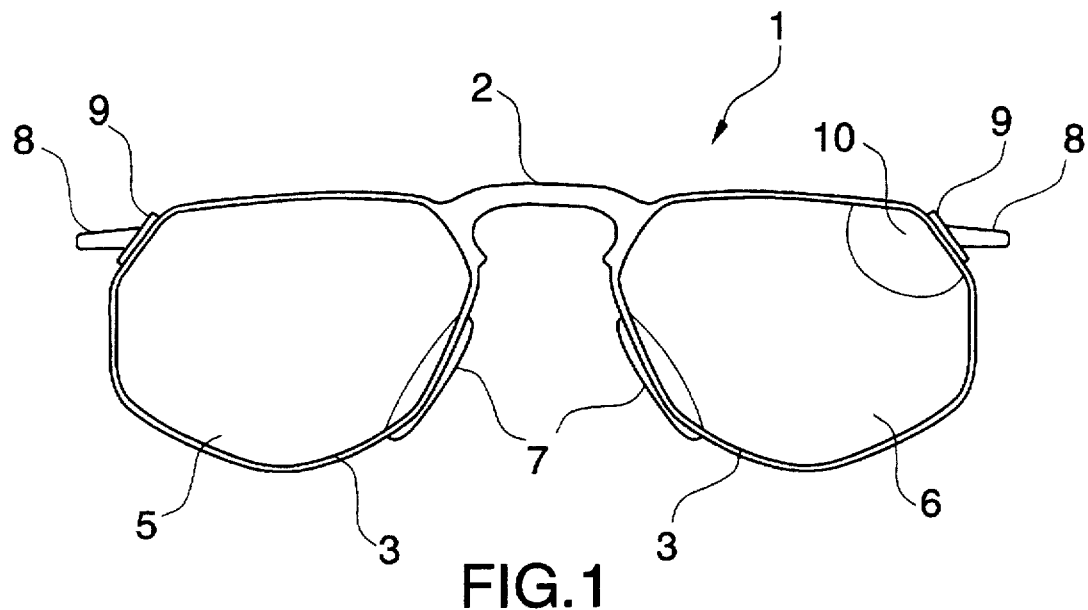
FIG. 1 is a front view of an ophthalmic apparatus according to one aspect of the present invention.

As shown in FIG. 1, a pair of eyeglasses 1 includes, a frame 2, lens supporting structures 3 in which lenses 5 and 6 are fixedly mounted, a nose pad 7 attached to the frame 2, and a pair of left and right temples 8 connected by hinges 9 to the left and right sides of the frame 2 and extend away from the frame towards the ears. The lens on the ocular sinister (O.S.) side of the frame contains a bifocal element. As can be seen by FIG. 1, near vision segment 10 is located in the uppermost temporal section of the frame. The remainder of the lens 6, as well as the entire lens 5 in the ocular dexter side of the frame is for distance viewing.

Figure 2:
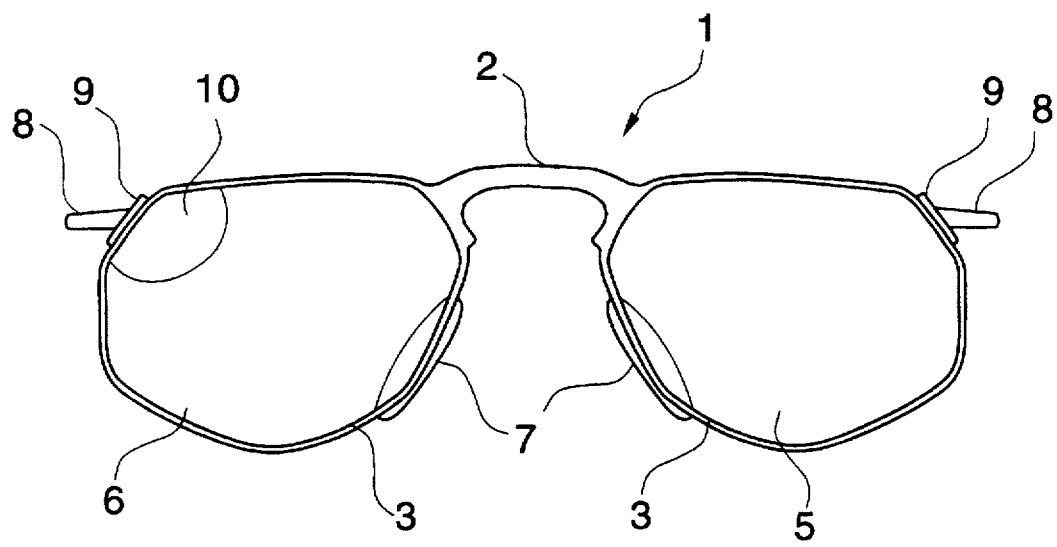
FIG. 2 is a front view of an ophthalmic apparatus according to another aspect of the present invention.
Figure 3:
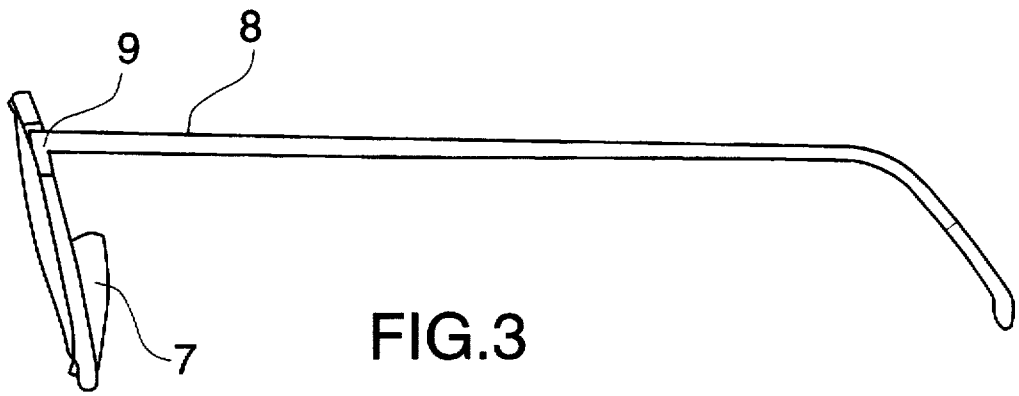
FIG. 3 is a side view according to the present invention.

The reverse configuration is illustrated in FIG. 2. As can been seen, all of the elements in FIG. 2 have identical numerals as FIG. 1. The lens on the ocular dexter (O.D.) side of the frame contains a bifocal element. As can be seen, near vision segment 10 is located in the uppermost temporal section of the frame. The remainder of the lens 6, as well as the entire lens 5 in the ocular sinister side of the frame is for distance viewing.

With this reconfigured bifocal, the golfer is able to utilize approximately 90% of lenses 5 and 6 for distance vision and the near vision segment 10 for reading, scoring, etc. The location of the near vision segment 10 allows the golfer to play without the conventional bifocal interference.

The bifocal element employed is a 1–22 millimeter TK type lens of any shape. Preferably, the bifocal element is a 9–15 millimeter TK type lens with a generally circular configuration. Further preferably, its length (through the diameter) after being cut to fit the frame is no shorter than 10 millimeters with an optimum length of 14–17 millimeters. The NV segment is positioned approximately 5 millimeters above the optical center (O.C.) of the lens, and as far temporal as practical.

During manufacture, the bifocal element may be made from a DV blank, whereupon the NV segment is ground thereupon.

Another practical embodiment of the invention is configured for a golfer who wears glasses only for near vision, i.e. reading glasses. In this instance, in FIGS. 1 and 2, the segments used for DV are Plano, non-corrective in nature, whereas the temporal segment used for near vision is the only corrective portion of the eyeglasses. In this fashion, the golfer may use the Plano lenses for DV and the near vision segment for NV. Accordingly, the golfer no longer has to apply and remove his reading glasses.

Figure 4:
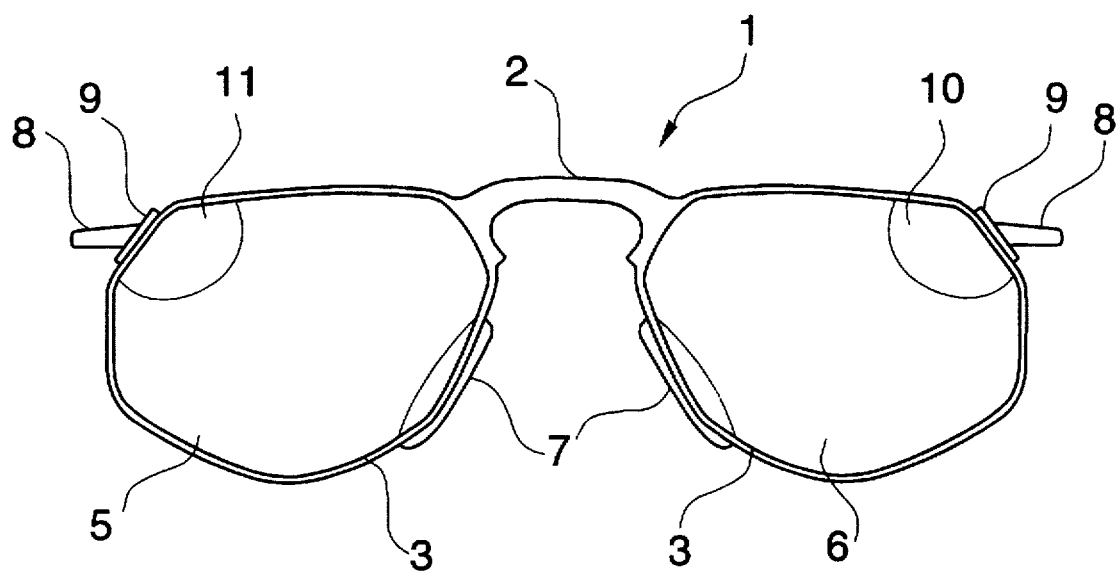
FIG. 4 is a front view of an ophthalmic apparatus according to a second embodiment of the present invention.

Referring to FIG. 4, another practical embodiment of the invention is configured such that near vision segments 10 and 11 are provided in the upper outermost temporal sections of both lenses, while the remainder of each lens is configured for distance vision, or may be non-corrective as discussed above.

The nature and shape of the lenses and frames is not intended to be limited to the depictions in the drawings. For instance, the lens supporting structures 3 need not encircle the entire lens, but may be provided only at the top of the lens, or in any other suitable fashion. Further, the lenses and/or segments may be of any particular shape such as square, rectangular, oval, etc. and are not limited to the depictions in the drawings.

The method of the present invention involves assembling the ophthalmic apparatus by fixedly mounting lenses 5 and 6 into lens supporting structures 3. Referring to FIGS. 1 and 2, the lens containing the bifocal element is positioned in the ocular sinister side of the frame for a person who writes with their right hand. Conversely, the lens containing the bifocal element is positioned in the ocular dexter side of the frame for a person who writes with their left hand. In the alternative, and depending upon the preference of the wearer, the second lens may be placed in the dexter side of the frame for golfers with a right-handed swing, or in the sinister side of the frame for golfers with a left-handed swing. In another alternative embodiment, the method of the present invention involves a configuration such that at least one of the lenses 5 and 6 contains a near vision segment provided in the upper outermost temporal section of the lens or lenses, while the remainder of the lens or lenses is configured for distance vision, or may be non-corrective as discussed above.

Although particular embodiments of the invention have been shown and described herein, there is no intention to thereby limit the invention to the details of such embodiments. On the contrary, the intention is to cover all modifications, alternatives, embodiments, usages and equivalents as fall within the spirit and scope of the present invention, specification, and appended claims.

What is claimed:

1. An ophthalmic apparatus comprising:
   a frame having first and second lens supporting structures;
   a first lens supported by said first lens supporting structure of said frame, said first lens comprising only a lens for distance viewing;
   a second lens supported by said second lens supporting structure of said frame, said second lens comprising a lens segment for distance viewing and a lens segment having a corrective power for near viewing.

2. The ophthalmic apparatus according to claim 1, wherein said near viewing segment is provided in an upper outermost temporal portion of said second lens.

3. The ophthalmic apparatus according to claim 2, wherein said near viewing segment is no less than 9 mm in diameter.

4. The ophthalmic apparatus according to claim 3, wherein said near viewing segment is substantially semi-circular in shape.

5. The ophthalmic apparatus according to claim 4, wherein said near viewing segment is provided at a position 5 mm above an optical center of said second lens.

6. The ophthalmic apparatus according to claim 1, wherein said second lens is mounted in an ocular dexter side of said frame for wearers who write with their left hand.

7. The ophthalmic apparatus according to claim 1, wherein said second lens is mounted in an ocular sinister side of said frame for wearers who write with their right hand.

8. The ophthalmic apparatus according to claim 1, wherein said second lens is mounted in an ocular dexter side of said frame for golfers who employ a right-handed swing.

9. The ophthalmic apparatus according to claim 1, wherein said second lens is mounted in an ocular sinister side of said frame for golfers who employ a left-handed swing.

10. An ophthalmic apparatus comprising:
    a frame having first and second lens supporting structures;
    a first lens supported by said first lens supporting structure of said frame, said first lens comprising a lens segment for distance viewing; and
    a second lens supported by said second lens supporting structure of said frame, said second lens comprising a lens segment for distance viewing;
    wherein at least one of said first and second lenses comprises a lens segment for near viewing, said near viewing segment of said at least one of said first and second lenses being provided in an upper outermost temporal portion of said at least one of said first and second lenses.

11. The ophthalmic apparatus according to claim 10, wherein said near viewing segments of said at least one of said first and second lenses are not less than 9 mm in diameter.

12. The ophthalmic apparatus according to claim 11, wherein said near viewing segments of said at least one of said first and second lenses are substantially semi-circular in shape.

13. The ophthalmic apparatus according to claim 12, wherein said near viewing segments of said at least one of said first and second lenses are provided at a position 5 mm above an optical center of said first and second lenses.

14. A method of assembling an ophthalmic apparatus comprising the steps of:
    fixedly mounting first and second lenses in a frame having first and second lens supporting structures;
    wherein said first lens supported by said first lens supporting structure comprises only a lens for distance viewing; and
    wherein said second lens supported by said second lens supporting structure comprises a lens segment for distance viewing and a lens segment having a corrective power for near viewing.

15. The method of claim 14, wherein said near viewing segment is provided in an upper outermost temporal portion of said second lens.

16. The method of claim 15, wherein said near viewing segment is no less than 9 mm in diameter.

17. The method of claim 16, wherein said near viewing segment is substantially semi-circular in shape.

18. The method of claim 17, wherein said near viewing segment is provided at a position 5 mm above an optical center of said second lens.

19. The method of claim 18, wherein said near viewing segment is positioned in an ocular dexter side of said frame for wearers who write with their left hand.

20. The method of claim 18, wherein said near viewing segment is positioned in an ocular sinister side of said frame for wearers who write with their right hand.

21. The method of claim 18, wherein said near viewing segment is positioned in an ocular dexter side of said frame for golfers who employ a right-handed swing.

22. The method of claim 18, wherein said near viewing segment is positioned in an ocular sinister side of said frame for golfers who employ a left-handed swing.

23. A method of assembling an ophthalmic apparatus comprising the steps of: fixedly mounting first and second lenses in a frame having first and second lens supporting structures;
    wherein at least one of said first and second lenses comprises a lens segment for distance viewing and a lens segment having a corrective power for near viewing; and wherein said near viewing segment is provided in an uppermost temporal portion of said at least one of said first and second lenses.

24. The method of claim 23, wherein said at least one of said near viewing segments are not less than 9 mm in diameter.

25. The method of claim 24, wherein said at least one of said near viewing segments are substantially semi-circular in shape.

26. The method of claim 25, wherein said at least one of said near viewing segments are provided at a position 5 mm above an optical center of said lens.

27. A method of playing golf while wearing bifocals having a distance viewing lens segment and a near viewing lens segment, said near viewing lens segment positioned in an upper outermost temporal portion of only lens, said method comprising:

a) playing at least one golf stroke while directing a line of vision through said distance viewing segment;

b) performing an activity requiring near vision while directing a line of vision through said near viewing lens segment.

28. The method of claim 27, wherein said activity is score keeping.

29. The method of claim 27, wherein said activity is reading.

30. The method of claim 27, wherein said activity is observing the time.

31. The method of claim 27, wherein said near viewing segment is mounted in an ocular dexter side of said frame for wearers who write with their left hand.

32. The method of claim 27, wherein said near viewing segment is mounted in an ocular sinister side of said frame for wearers who write with their right hand.

33. The method of claim 27, wherein said near viewing lens segment is mounted in an ocular dexter side of said frame for golfers who employ a right-handed swing.

34. The method of claim 27, wherein said near viewing lens segment is mounted in an ocular sinister side of said frame for golfers who employ a left-handed swing.

* * * * *

UNITED STATES PATENT AND TRADEMARK OFFICE
CERTIFICATE OF CORRECTION

PATENT NO.  : 5,790,226
DATED       : August 4, 1998
INVENTOR(S) : D. Pollak

It is certified that error appears in the above-identified patent and that said Letters Patent is hereby corrected as shown below:

Column 7, line 10, after "only" insert --one--.

Signed and Sealed this

Second Day of March, 1999

Attest:

Q. TODD DICKINSON

Attesting Officer

Acting Commissioner of Patents and Trademarks